(12) United States Patent
Harrison

(10) Patent No.: US 6,403,222 B1
(45) Date of Patent: Jun. 11, 2002

(54) WAX-MODIFIED THERMOSETTABLE COMPOSITIONS

(75) Inventor: Bruce L. Harrison, Sterling Heights, MI (US)

(73) Assignee: Henkel Corporation, Gulph Mills, PA (US)

(*) Notice: Subject to any disclaimer, the term of this patent is extended or adjusted under 35 U.S.C. 154(b) by 0 days.

(21) Appl. No.: 09/668,671

(22) Filed: Sep. 22, 2000

(51) Int. Cl.$^7$ .................. B32B 27/38; B32B 3/26; C08J 9/00; C08L 63/00; C08K 5/01

(52) U.S. Cl. ............... 428/418; 428/413; 428/304.4; 428/313.3; 521/76; 521/82; 521/98; 521/99; 521/128; 523/400; 523/465

(58) Field of Search ............... 428/413, 414, 428/416, 418, 304.4, 313.3; 521/76, 82, 98, 99, 128; 523/400, 427, 428, 465

(56) References Cited

U.S. PATENT DOCUMENTS

| | | | |
|---|---|---|---|
| 4,001,368 A | * 1/1977 | Michizoe et al. | 264/176 R |
| 4,595,623 A | 6/1986 | DuPont et al. | 428/195 |
| 4,737,407 A | 4/1988 | Wycech | 428/323 |
| 4,751,249 A | 6/1988 | Wycech | 521/54 |
| 4,769,391 A | 9/1988 | Wycech | 521/54 |
| 4,836,516 A | 6/1989 | Wycech | 267/279 |
| 4,853,270 A | 8/1989 | Wycech | 428/68 |
| 4,861,097 A | 8/1989 | Wycech | 296/188 |
| 4,923,902 A | 5/1990 | Wycech | 521/54 |
| 4,978,562 A | 12/1990 | Wycech | 428/35.8 |
| 5,124,186 A | 6/1992 | Wycech | 428/35.8 |
| 5,274,006 A | 12/1993 | Kagoshima et al. | 521/85 |
| 5,453,453 A | 9/1995 | Lamon et al. | 521/54 |
| 5,470,886 A | 11/1995 | Makhlouf et al. | 521/59 |
| 5,476,884 A | * 12/1995 | Kayaba et al. | 523/443 |
| 5,575,526 A | 11/1996 | Wycech | 296/205 |
| 5,712,317 A | 1/1998 | Makhlouf et al. | 521/76 |
| 5,755,486 A | 5/1998 | Wycech | 296/188 |
| 5,804,608 A | 9/1998 | Nakazato et al. | 521/135 |
| 5,859,096 A | 1/1999 | Hoge et al. | 523/427 |
| 5,884,960 A | 3/1999 | Wycech | 296/146.6 |
| 5,888,600 A | 3/1999 | Wycech | 428/35.9 |
| 5,977,271 A | * 11/1999 | McKay et al. | 526/170 |
| 5,996,167 A | 12/1999 | Close | 15/230.12 |
| 6,003,274 A | 12/1999 | Wycech | 52/232 |
| 6,040,350 A | 3/2000 | Fukui | 521/135 |
| 6,058,673 A | 5/2000 | Wycech | 52/721.4 |
| 6,068,424 A | 5/2000 | Wycech | 403/269 |
| 6,096,403 A | 8/2000 | Wycech | 428/122 |
| 6,103,784 A | 8/2000 | Hilborn et al. | 523/219 |
| 6,110,982 A | 8/2000 | Russick et al. | 521/54 |
| 6,165,588 A | 12/2000 | Wycech | 428/122 |
| 6,168,226 B1 | 1/2001 | Wycech | 296/146.6 |
| 6,199,940 B1 | 3/2001 | Hopton et al. | 296/187 |
| 6,214,904 B1 | * 4/2001 | Tanaka et al. | 523/409 |
| 6,274,674 B1 | * 8/2001 | Chang et al. | 525/129 |

FOREIGN PATENT DOCUMENTS

| | | |
|---|---|---|
| EP | 0891918 | 1/1999 |
| EP | 0893332 | 1/1999 |
| WO | WO9305103 | 3/1993 |
| WO | WO9908854 | 2/1999 |
| WO | WO0012595 | 3/2000 |
| WO | WO0027920 | 5/2000 |
| WO | WO0052086 | 9/2000 |

OTHER PUBLICATIONS

JP 8142260, Abstract.
JP 11263865, Abstract.

* cited by examiner

*Primary Examiner*—Robert Dawson
*Assistant Examiner*—Michael J Feely
(74) *Attorney, Agent, or Firm*—Stephen D. Harper

(57) ABSTRACT

Waxes, particularly paraffin and microcrystalline waxes, can act as corrosion inhibitors when added at low levels to compositions based on thermosettable resins such as epoxy resins. When such wax-modified thermosettable compositions are used to coat a metallic surface, enhanced protection of the metallic surface against corrosion due to environmental exposure such as salt spray is obtained. The thermosettable compositions are particularly useful in expandable or foamable form for imparting structural reinforcement to hollow metal parts such as automotive components.

26 Claims, No Drawings

WAX-MODIFIED THERMOSETTABLE COMPOSITIONS

BACKGROUND OF THE INVENTION

1. Field of the Invention

The invention relates to a thermosettable composition useful for protecting a metallic surface against corrosion.

2. Discussion of the Related Art

It is known that a number of industries, e.g., the automobile industry, require parts that are both strong and light-weight. One attempt to achieve this balance between strength and minimal weight utilizes hollow parts constructed of relatively thin sheet metal. However, hollow metal parts are easily distorted. Accordingly, it is also known that the presence of structural foam in the cavities of the hollow parts can improve the strength and stiffness of such parts.

Generally, such foams are prepared from formulations comprising a thermosettable resin such as an epoxy resin, a blowing agent and fillers and reinforcing agents such as hollow glass microspheres. Preferably, these foams have a density of about 20–40 lb/ft$^3$ (about 0.30–0.65 g/cc) and are able to withstand heat in excess of 175° C., most preferably in excess of 200° C. Optional ingredients include curatives, processing aids, stabilizers, colorants, and UV absorbers.

Composites comprised of a metal substrate and a structural foam must be capable of withstanding prolonged exposure to moisture (e.g., through water immersion or high humidity conditions) with minimal corrosion of the surface of the metal, which is in contact with the structural foam. The structural foam component contains cells, which can trap moisture. The trapped moisture (particularly when dissolved salts are present) corrodes the metal surface; the resulting corrosion degrades the ability of the structural foam to adhere to the metal surface. Eventually, full or partial adhesive bond failure can occur wherein the structural foam separates from the metal substrate, thereby weakening the composite. It would therefore be highly desirable to develop methods of retaining the desirable reinforcing properties of the composite when the composite is used in a water-containing environment.

SUMMARY OF THE INVENTION

It has now been found that the addition of a relatively minor amount of wax to thermosettable compositions used to form composites with metal parts greatly improves the resistance of the composite to moisture, salt spray and the like. The wax-modified thermosettable composition provides composites such as structural foam -reinforced hollow metal parts wherein the metal surface in contact with the cured thermosettable composition exhibits significantly reduced corrosion as compared to composites prepared using analogous wax-free thermosettable compositions. Corrosion of the metal surface is even greatly reduced at the isolated areas at the interface of the thermoset and the metal surface where the thermoset is not bonded tightly to the metal surface, which normally are sites of attack by moisture. Retention of compressive strength and modulus upon prolonged environmental exposure is also greatly improved. The presence of the wax at low levels does not interfere with the adhesive bond between the cured thermosettable composition and the metal substrate. This result was quite surprising, as waxes are commonly used in industry as mold release agents.

DETAILED DESCRIPTION OF THE INVENTION

Waxes are water-insoluble substances which are solid at ambient temperatures with a relatively low melting point and which are capable of softening when heated and hardening when cooled. Petroleum waxes (essentially saturated hydrocarbon mixtures obtained by the refining of petroleum) are preferred for use in the present invention, with paraffinic and microcrystalline waxes being especially preferred. Such materials are well-known in the art (see, for example, the chapter entitled "Waxes" in Vol. 17 of the Encyclopedia of Polymer Science and Engineering, Second Edition) and are readily available from a number of commercial sources. For example, the AKROWAX petroleum waxes sold by Akrochem Corporation of Akron, Ohio may be utilized in the present invention (including AKROWAX 5030, AKROWAX 5031 and AKROWAX 5032). Mixtures and blends of different waxes may be employed.

An amount of wax is incorporated into the thermosettable composition, which is effective to improve the corrosion and moisture resistance of a composite comprised of a metal substrate and a thermoset derived by curing the thermosettable composition. Such amounts may vary depending upon the particular thermosettable composition, metal substrate, and wax selected, but typically will be at least about 0.05% by weight, more preferably at least about 0.1% by weight, of the thermosettable composition. At the same time, however, the wax concentration should not be so great that the properties of the composite, such as the adhesion of the thermoset to the surface of the metal substrate, are significantly compromised. Generally speaking, no more than about 2% by weight, more preferably no more than about 1% by weight, of wax is present in the thermosettable composition. The optimum amount of wax for a particular end-use application may be readily determined by standard experimental techniques.

While in principle any of the thermosettable resins known in the art may be employed, including, for example, vinyl esters, thermoset polyesters, urethanes, phenolic resins, and the like, the present invention is especially well-suited for use with epoxy resin-based systems.

Any of the thermosettable resins having an average of more than one (preferably about two or more) epoxy groups per molecule known or referred to in the art may be utilized as the epoxy resin component of the present invention.

Epoxy resins are described, for example, in the chapter entitled "Epoxy Resins" in the Second Edition of the *Encyclopedia of Polymer Science and Engineering*, Volume 6, pp. 322–382 (1986). Exemplary epoxy resins include polyglycidyl ethers obtained by reacting polyhydric phenols such as bisphenol A, bisphenol F, bisphenol AD, catechol, resorcinol, or polyhydric alcohols such as glycerin and polyethylene glycol with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins. Mixtures of epoxy resins may be used if so desired; for example, mixtures of liquid (at room temperature), semi-solid, and/or solid epoxy resins can be employed. Any of the epoxy resins available from commercial sources are suitable for use in the present invention. Preferably, the epoxy resin has an epoxide equivalent molecular weight of from about 150 to 1000.

The use of epoxy resins based on glycidyl ethers of bisphenol A is especially advantageous. The epoxy resin preferably contains an average of about 2 epoxy groups per molecule and should be selected so as to provide the desired combination of properties in both the thermosettable composition and the final cured thermoset and composite prepared therefrom.

The hardening of the thermosettable resins utilized in the present invention may be accomplished by the addition of any of the chemical materials known in the art for curing such resins. Such materials are referred to herein as "curatives", but also include the substances known to workers in the field as curing agents, hardeners, activators, catalysts or accelerators. While certain curatives promote curing by catalytic action, others participate directly in the reaction of the resin and are incorporated into the thermoset polymeric network formed by condensation, chain-extension and/or crosslinking of the resin. Where the thermosettable resin is an epoxy resin, it is particularly desirable to employ at least one curative, which is a nitrogen-containing compound. Such curatives (along with other curatives useful for hardening epoxy resins) are described in the chapter in the *Encyclopedia of Polymer Science and Engineering* referenced hereinabove. Latent curatives (i.e., curatives that activate only upon heating to an elevated temperature) are preferred for use where the thermosettable composition is to be stored for an extended period of time at room temperature prior to use.

Suitable nitrogen-containing compounds useful as curatives include amino compounds, amine salts, and quaternary ammonium compounds. Particularly preferred types of nitrogen-containing compounds include amine-epoxy adducts, borontrihalide amine adducts, imidazoles, ureas, and guanidines (e.g., dicyandiamide). In one desirable embodiment of the invention, two or more different types of these nitrogen-containing compounds are used in combination.

Amine-epoxy adducts are well-known in the art and are described, for example, in U.S. Pat. Nos. 3,756,984; 4,066,625; 4,268,656; 4,360,649; 4,542,202; 4,546,155; 5,134,239; 5,407,978; 5,543,486; 5,548,058; 5,430,112; 5,464,910; 5,439,977; 5,717,011; 5,733,954; 5,789,498; 5,798,399 and 5,801,218, each of which is incorporated herein by reference in its entirety. Such amine-epoxy adducts are the products of the reaction between one or more amine compounds and one or more epoxy compounds. Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted. Preferably, the adduct is a solid which is insoluble in the epoxy resin component of the present invention at room temperature, but which becomes soluble and functions as an accelerator to increase the cure rate upon heating. While any type of amine could be used (with heterocyclic amines and/or amines containing at least one secondary nitrogen atom being preferred), imidazole compounds are particularly preferred. Illustrative imidazoles include 2-methyl imidazole, 2,4-dimethyl imidazole, 2-ethyl-4-methyl imidazole, 2-phenyl imidazole and the like. Other suitable amines include, but are not limited to, piperazines, piperidines, pyrazoles, purines, and triazoles. Any kind of epoxy compound can be employed as the other starting material for the adduct, including monofunctional, bifunctional, and polyfunctional epoxy compounds such as those described previously with regard to the epoxy resin component. Suitable amine-epoxy adducts are available from commercial sources such as Ajinomoto, Inc., Shell, Pacific Anchor Chemical Company, and the Asahi Chemical Industry Company Limited. The products sold by Ajinomoto under the trademarks AJICURE PN40 and AJICURE PN-23 are especially preferred for use in the present invention.

Dicyandiamide (sold commercially by Air Products under the trademark DICY) is also a particularly preferred curative, although other guanidine compounds may also be utilized. The curative system may also comprise one or more ureas, either alone or in combination with other types of curatives (especially guanidines such as dicyandiamide). Suitable ureas include alkyl and aryl substituted ureas. Many such ureas are available commercially, for example, N, N'-dimethyl urea, which is sold under the trademark AMICURE UR by Air Products.

Suitable boron trihalide adducts include boron trichloride adducts of amines such as monoethanolamine, diethylamine, dioctylmethylamine, triethylamine, pyridine, benzylamine, benzyldimethyl amine, and the like. Boron trichloride amine adduct curatives are available commercially from companies such as Ciba Specialty Chemicals and CVC Specialty Chemicals, Inc.

The curative system (i.e., the specific curatives and the amounts of such curatives) should, in one desirable embodiment, be selected such that it does not catalyze curing of the thermosettable composition to any significant extent under typical storage conditions over an extended period of time. Preferably, the components of the curative system are adjusted such that the thermosettable composition retains a workable consistency (in one embodiment of the invention, a consistency resembling that of a pliable dough or putty) for more than two weeks at 130° F. and does not expand in volume or decrease in specific gravity under such conditions to an unacceptable extent, yet foams and cures within 10 minutes upon being heated at 150° C. or higher with no appreciable deterioration in performance during storage.

In one embodiment of the invention, the components of the thermosettable composition and relative proportions of said components are selected such that the thermosettable composition is pumpable. That is, such thermosettable composition is capable of being pumped into a hollow space or cavity where reinforcement is desired (such, as for example, a hydroformed part of a vehicle which is otherwise not readily accessible). The thermosettable composition which has been introduced in such manner is thereafter heated (by, for example, placing the vehicle in a paint oven) to a temperature effective to cure (and expand, where the composition is expandable) the thermosettable composition. Pumping of the thermosettable composition will generally be carried out at a temperature higher than room temperature, but lower than the temperature needed to initiate curing and foaming.

The thermosettable compositions of the invention may be formulated to include one or more additional components, including, for example, blowing agents (to render the composition expandable/foamable), fillers, colorants, thixotropic agents (rheological control agents), toughening or flexibilizing agents, stabilizers, and the like.

In one embodiment of the invention, the thermosettable composition is formulated to have the consistency of a pliable dough at room temperature which can be readily formed into a desired shape by extrusion, molding or the like and yet retains that shape once the forming operation is completed. If the thermosettable composition viscosity is too low due to, for example, the presence of liquid components such as low molecular weight epoxy resins or reactive diluents, thixotropic agents such as fumed silica (especially hydrophobic fumed silica), coated calcium carbonate, clays, bentonites, and the like can be added.

Selection of the blowing agent or blowing agents to be used in the present invention is not believed to be particularly critical, although chemical blowing agents rather than physical blowing agents are preferred if a storage-stable, ready-to-use one-part composition is desired. Any of the chemical blowing agents known in the art may be employed, with azodicarbonamide (also sometimes referred to as 1,1'-azobisformamide, AZDC or ADC) and sulfonyl hydrazides providing particularly good performance. In one embodiment of the invention, azodicarbonamide is utilized as the predominate or, more preferably, sole blowing agent; mixtures with sulfonylhydrazides may be desirable for certain purposes, however. Azodicarbonamide is available from a number of commercial sources; for example, it is sold under the trademark UNICELL by Dong Jin Chemical of South Korea and under the CALOGEN trademark by Uniroyal Chemical. "Activated" or "modified" forms of azodicarbonamide may be used to advantage. Suitable sulfonylhydrazide blowing agents include, but are not limited to, p,p'-oxybis (benzenesulfonylhydrazide) (sold by Uniroyal Chemical under the trademark CELOGEN OT), p-toluenenesulfonylhydrazide (sold by Uniroyal Chemical under the trademark CELOGEN TSH) and the like. The particle size of the blowing agent may be adjusted so as to provide the desired foaming characteristics in the cured foam. Smaller particle sizes, for example, tend to provide foams having more uniform cell structure.

Expandable thermoplastic resin microspheres (which can comprise, for example, volatile physical blowing agents such as hydrocarbons or halocarbons encapsulated in thermoplastic shells) may also be employed to render the thermosettable composition foamable. Particularly preferred expandable microspheres are available from Casco Nobel AB under the trademark EXPANCEL.

In some formulations, it may be desirable to also use a blowing agent activator or accelerator so as to lower the temperature at which release of gas from the blowing agent takes place. Suitable blowing agent activators include, but are not limited to, ureas (such as the surface-coated, oil-treated urea sold by Uniroyal Chemicals under the trademark BIKOT), polyols, organic acids, amines, and lead, zinc, tin, calcium and cadmium oxides and salts (including carboxylic acid salts). Typically, from about 0.1% to about 2% blowing agent activator based on the weight of the thermosettable composition is employed, although the optimum amount will of course vary depending upon the activator/accelerator selected, the amount of blowing agent, cure temperature and other variables. Excess activator should not be used since the storage stability may thereby be adversely affected.

It will be especially desirable to include one or more glass fillers in the thermosettable composition, as such fillers impart useful characteristics to the resulting thermoset. For example, hollow glass microspheres may be added to reduce the density of the thermoset while maintaining good strength and stiffness. Commercially available hollow glass microspheres (sometimes also referred to as glass microballoons or microbubbles) include the materials sold by Minnesota Mining & Manufacturing under the trademark SCOTCHLITE, with suitable grades including those available under the designations B38, C15, K20 and VS 5500. The glass microspheres preferably have diameters in the range of from about 5 to 200 micrometers (preferably, no greater than 70 micrometers). The crush strength of the hollow glass microspheres may be selected in accordance with the desired characteristics of the cured thermoset or composite containing such thermoset. Glass fiber is another preferred type of glass filler, since it helps increase the strength and stiffness of the thermoset. The glass fiber may be chopped, milled or in other suitable physical form.

Other types of fillers may also optionally be present in the thermosettable composition. Any of the conventional organic or inorganic fillers known in the thermosettable resin art may be used including, for example, silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), fibers other than glass fibers (e.g., wollastonite fibers, carbon fibers, ceramic fibers, aramid fibers), calcium oxide, wollastonite, alumina, clays, sand, metals (e.g., aluminum powder), microspheres other than glass microspheres such as ceramic microspheres, thermoplastic resin microspheres, thermoset resin microspheres, and carbon microspheres (all of which may be solid or hollow, expanded or expandable) and the like.

Other optional components include diluents (reactive or non-reactive) such as glycidyl ethers, glycidyl esters, acrylics, solvents and plasticizers, toughening or flexibilizing agents (e.g., aliphatic diepoxides, polyaminoamides, liquid polysulfide polymers), wetting agents/adhesion promoters, colorants (e.g., dyes and pigments such as carbon black), stabilizers (e.g., antioxidants, UV stabilizers) and the like.

It is particularly advantageous to include or more rubbers in the thermosettable composition, as such additives will toughen the thermoset and reduce the tendency of the thermoset to crack under stress. As used herein, the term "rubbers" includes both rubbers and elastomers. Suitable rubbers include thermoplastic as well as thermosettable (reactive) rubbers. Illustrative types of rubber include styrene-butadiene rubbers (SBR), nitrile-butadiene rubbers, butyl rubbers, polyisoprene, natural rubber, polybutadiene, chlorobutyl rubbers (neoprene), isobutylene polymers, alpha-olefin elastomers, ethylene-propylene elastomers, chlorosulfonated polyethylenes, ethylene-propylene-diene (EPDM) rubbers, ethylene-vinyl acetate rubbers, halogenated rubbers, hydrogenated natural rubbers, and the like. Thermoplastic block copolymers are one particularly preferred class of rubbers for use in the present invention. Such materials contain one or more base segments ("A") covalently bonded to one or more soft or elastomeric segments ("B"). The A segments may be polystyrene, poly (alpha-methylstyrene), polyethylene, polyurethane, polysulfone, polyester, polycarbonate or the like. The B segments may be polybutadiene, polyisoprene, poly (ethylene-co butylene), polydimethylsiloxane, polyether, or the like. The block copolymers may have a linear, branched, radial or star structure and may, for example, correspond to the general structure A-B-A, $(A-B)_n$, and so forth. SIS, SEBS and SBS block copolymers are examples of specific types of such materials. Liquid rubbers such as butadiene-acrylonitrile copolymers, which may be functionalized with carboxy groups, amine groups, or other groups capable of reacting with other components of the thermosettable composition, may also be employed.

The thermosettable compositions of the present invention may be utilized in any end-use application where an adhesive, sealant or coating is required. However, the thermosettable compositions (particularly when formulated to include blowing agents) are especially useful in the production of automobiles and other vehicles to maintain or increase the strength of metallic structural members such as rockers, pillars, radiator support beams, doors, reinforcing beams and the like. The use of structural reinforcement foams in such applications is described, for example, in U.S. Pat. Nos. 4,901,500; 4,908,930; 4,751,249; 4,978,562; 4,995,545; 5,124,186; 5,575,526; 5,755,486; 4,923,902; 4,922,596; 4,861,097; 4,732,806; 4,695,343; 4,610,836; 6,068,424; 6,058,673; 6,003,274; 5,992,923; 5,888,600; 6,092,864; 6,079,180 and 5,884,960 (each of which is incorporated herein by reference in its entirety). Suitable metal substrates include steel, galvanized steel, and other metals containing iron which ordinarily are susceptible to corrosion.

To further improve the corrosion resistance of the composite, the thermosettable composition may additionally include one or more coupling agents and/or metal-modified inorganic oxides. Suitable coupling agents include silanes and organometallates such as organic titanates and zirconates. Organic titanates and zirconates are well known in the art and are described, for example, in U.S. Pat. No. 6,103,784, which is incorporated herein by reference in its entirety. Suitable metal-modified inorganic oxides include alkaline earth metal-modified silicates, for example, calcium ion exchanged amorphous silica gels such as the SHIELDEX products available from the Grace Davison division of W. R. Grace.

The relative amounts of the above-described components may, in particular embodiments of the invention, correspond to the following ranges:

| Component | Preferred (wt %) | More Preferred (wt %) |
|---|---|---|
| Wax(es) | about 0.05 to about 2 | about 0.1 to about 1 |
| Thermosettable Resin(s) | about 30 to about 70 | about 40 to about 60 |
| Rubber(s) | 0 to about 20 | about 5 to about 15 |
| Curative(s) | about 0.5 to about 10 | about 1 to about 6 |
| Hollow Glass Microspheres | 0 to about 40 | about 10 to about 30 |
| Filler(s) | 0 to about 20 | about 10 to about 15 |
| Blowing Agent(s) | 0 to about 5 | about 0.2 to about 4 |
| Thixotropic Agent(s) | 0 to about 5 | about 1 to about 3 |
| Coupling Agent(s) | 0 to about 3 | about 0.5 to about 1.5 |
| Metal-Modified Inorganic Oxides | 0 to about 5 | about 1 to about 3 |

The thermosettable compositions of the present invention can be readily prepared by simply mixing the individual components in desired proportions using planetary mixers, kneaders, rollers, or the like. If coupling agents and glass fillers (e.g., glass microspheres or glass fibers) are to be useed, it is preferred to combine the coupling agent with the epoxy resin before adding the glass filler. The wax is added following the addition of the glass filler.

EXAMPLES

Wax-modified thermosettable compositions in accordance with the invention were prepared using the components listed in Tables I-A through V-A. The properties of the uncured and cured compositions were measured as follows:

50 Gram Needle Penetration—Run at 75° F. for 5 seconds.

Percent Expansion—5 g sample; baked 30 minutes at 275° F.

Adhesion—Samples of the thermosettable compositions (1 mm thick by 2"by 7") were applied to the surface of cold rolled steel (CRS) panels and baked 30 minutes at either 350° F. (Ex. 1–4 and 15–24) or 295° F. (Ex. 5–14 and 25–43). Clean as well as oiled panels were tested, the oiled panels being coated with either 61K2M or Feercote oil.

Compressive Strength—Samples (75 g each) were placed in 36 mm diameter cardboard tubes and baked either 45 minutes at 295° F. (Ex. 1–14 and 30–43), 30 minutes at 295° F. (ex. 25–29), or 45 minutes at 350° F. (Ex. 15–24). The cured samples were cut to 72 mm in length and crushed at 0.5 inches per minute. Values shown are an average of 3 samples.

Lap Shear Strength—Composites were prepared using 0.060 inch thick clean cold rolled steel coupons with 1 inch overlap and 4 mm spacers. Composites were baked 30 minutes at 275° F. (except for Examples 15–24, which were baked 30 minutes at 350 degrees F.) and then pulled apart at 2 inches per minute. Values shown are an average of 5 samples.

Examples 1–4

These examples (Tables I-A & B) illustrate embodiments of the invention wherein initiation of foaming and curing can be accomplished at a relatively low temperature (e.g., 250° F. to 275° F.) while maintaining good storage stability at ambient temperatures. Varying amounts of a titanate coupling agent were used to study the effect of such coupling agent on adhesion of the cured composition to oily metal surfaces. In Example 3, the glass fiber reinforcing filler present in the other formulations was omitted.

Examples 5–14

These examples (Tables II-A & B) demonstrate the effect of incorporating a higher molecular weight epoxy resin (EPON 1001 epoxy resin, a product of Shell Chemical) to stiffen the thermosettable composition and reduce tack. Small amounts of polyaramid fiber were used in Examples 13 and 14 as a full or partial replacement for the glass fiber used in other examples. Adjustments in the combination of coupling agents employed were also made to improve adhesion to metal surfaces and to compensate for the slight losses in compressive strength and modulus observed upon partial substitution of the EPON 1001 epoxy resin for the PEP 6134 epoxy resin.

Examples 15–24

These examples (Tables III-A & B) illustrate thermosettable compositions in accordance with the present invention which are pumpable at 120° F. but which have the consistency of a sticky dough at room temperature. The relative amounts of different fiber fillers were varied to determine the feasibility of substituting polyaramid fibers for glass fibers, which tend to be somewhat abrasive in pumping systems, and for fumed silica, which is a thixotropic agent which adds to the cost of the formulation. A flexibilizing epoxy resin was used in combination with conventional bisphenol A diglycidyl ether epoxy resin in this series of examples.

TABLE I-A

| Component | Example 1, wt % | Example 2, wt % | Example 3, wt % | Example 4, wt % |
|---|---|---|---|---|
| Epoxy Resin[1] | 45.87 | 45.65 | 51.30 | 45.20 |
| Rubber[2] | 12.07 | 12.01 | 13.50 | 11.89 |

TABLE I-A-continued

| Component | Example 1, wt % | Example 2, wt % | Example 3, wt % | Example 4, wt % |
|---|---|---|---|---|
| Curative A[3] | 2.41 | 2.40 | 2.70 | 2.38 |
| Curative B[4] | 0.72 | 0.72 | 0.81 | 0.71 |
| Hollow Glass Microspheres[5] | 20.52 | 20.42 | 22.95 | 20.22 |
| Blowing Agent[6] | 1.74 | 1.73 | 1.94 | 1.71 |
| Glass Fiber | 12.07 | 12.01 | — | 11.89 |
| Thixotropic Agent[7] | 2.17 | 2.16 | 2.43 | 2.14 |
| Alkaline Earth Metal Modified Silicate[8] | 2.17 | 2.16 | 2.43 | 2.14 |
| Coupling Agent[9] | — | 0.48 | 1.67 | 1.47 |
| Wax[10] | 0.24 | 0.24 | 0.27 | 0.24 |

[1]PEP 6134 epoxy resin, a product of Peninsula Polymers
[2]NIPOL 1312 nitrile rubber, a product of Zeon
[3]OMICURE BC 120 boron trichloride amine adduct, a product of CVC Specialty Chemicals, Inc.
[4]AMICURE CG - 1400 dicyandiamide, a product of Air Products.
[5]SCOTCHLITE VS5500 microspheres, a product of Minnesota Mining & Manufacturing
[6]EXPANCEL O51 DU expandable microspheres, a product of Casco Nobel AB
[7]CAB-O-SIL TS720 fumed silica, a product of Cabot
[8]SHIELDEX calcium ion exchanged amorphous silica gel, a product of the Grace Davison division of W. R. Grace.
[9]CHARTWELL B515. 4HR titanate, a product of Chartwell International, Inc.
[10]AKROWAX 5030 wax, a product of Akrochem Corporation.

TABLE I-B

| Component | Example 1 | Example 2 | Example 3 | Example 4 |
|---|---|---|---|---|
| 50 g Needle Penetration (uncured), 1/10mm units | 94 | 98 | 127 | 96 |
| % Expansion | 42.9 | 29.1 | 36.3 | 27.7 |
| Adhesion to Cold Rolled Steel, % Cohesive Failure | | | | |
| Clean | 100[1] | 100[1] | 100[1] | 100[1] |
| Oiled with 61K2M oil | 50[1] | 100[1] | 100[1] | 100[1] |
| Oiled with Feercote oil | 50[1] | 100[1] | 100[1] | 100[1] |
| Compressive Strength | | | | |
| Maximum Load | 3690 | 3470 | 2690 | 2800 |
| Maximum PSI | 2340 | 2200 | 1710 | 1770 |
| Modulus | 138,000 | 121,000 | 97,000 | 126,000 |
| Maximum PSI/Sp. Gravity | 4680 | 4400 | 3880 | 3550 |
| Modulus/Sp. Gravity | 276,000 | 243,000 | 220,000 | 252,000 |
| Lap Shear Strength PSI | 357[1] | 344[1] | 303[1] | 293[1] |
| Lap Shear Strength/Sp. Gravity | 715 | 688 | 688 | 587 |

[1] Cohesive failure

TABLE II-A

| Component | Example 5, wt % | Example 6, wt % | Example 7, wt % | Example 8, wt % | Example 9, wt % | Example 10, wt % | Example 11, wt % | Example 12, wt % | Example 13, wt % | Example 14, wt % |
|---|---|---|---|---|---|---|---|---|---|---|
| Epoxy Resin A[1] | 45.91 | 41.32 | 41.24 | 41.27 | 41.19 | 41.08 | 36.51 | 36.51 | 38.33 | 39.40 |
| Epoxy Resin B[2] | — | 4.59 | 4.58 | 4.59 | 4.58 | 4.57 | 9.13 | 9.13 | 9.59 | 9 86 |
| Rubber[3] | 11.92 | 11.92 | 11.90 | 11.90 | 11.88 | 11.86 | 11.86 | 11.86 | 12.45 | 12.80 |
| Curative A[4] | 2.38 | 2.38 | 2.38 | 2.38 | 2.38 | 2.37 | 2.37 | 2.37 | 2.49 | 2 56 |
| Curative B[5] | 0.72 | 0.72 | 0.71 | 0.71 | 0.71 | 0.71 | 0.71 | 0.71 | 0.75 | 0.77 |
| Hollow Glass Microspheres[6] | 20.02 | 20.02 | 19.99 | 20.00 | 19.96 | 19.92 | 19.92 | 19.92 | 22.41 | 25.34 |
| Blowing Agent[7] | 1.72 | 1.72 | 1.90 | 1.71 | 1.90 | 2.13 | 2.13 | 2.13 | 2.24 | 2.30 |
| Glass Fiber | 11.92 | 11.92 | 11.90 | 11.90 | 11.88 | 11.86 | 11.86 | 11.86 | 4.98 | — |
| Polyaramid Fiber[8] | — | — | — | — | — | — | — | 1.00 | 1.02 | |
| Thixotropic Agent[9] | 2.15 | 2.15 | 2.14 | 2.14 | 2.14 | 2.13 | 2.13 | 2.13 | 2.24 | 2.30 |
| Alkaline Earth Metal Modified Silicate[10] | 2.15 | 2.15 | 2.14 | 2.14 | 2.14 | 2.13 | 2.13 | 2.13 | 2.24 | 2 30 |
| Coupling Agent A[11] | 0.41 | 0.41 | 0.40 | 0.40 | 0.40 | 0.40 | 0.40 | 0.40 | 0.42 | 0.44 |
| Coupling Agent B[12] | 0.12 | 0.12 | 0.12 | — | — | — | — | 0.24 | — | — |
| Coupling Agent C[13] | 0.36 | 0.36 | 0.36 | 0.36 | 0.36 | 0.36 | 0.36 | 0.36 | 0.37 | 0 38 |
| Coupling Agent D[14] | — | — | — | 0.24 | 0.24 | 0.24 | 0.24 | — | 0.25 | 0.26 |
| Wax[15] | 0.24 | 0.24 | 0.24 | 0.24 | 0.24 | Q.24 | 0.24 | 0.24 | 0.25 | 0.26 |

[1]PEP 6134 epoxy resin, a product of Peninsula Polymers
[2]EPON 1001 epoxy resin, a product of Shell
[3]NIPOL 1312 nitrile rubber, a product of Zeon
[4]OMICURE BC 120 boron trichloride amine adduct, a product of CVC Specialty Chemicals, Inc.
[5]AMICURE CG-1400 dicyandiamide, a product of Air Products
[6]SCOTCHLITE VS5500 microspheres, a product of Minnesota Mining and Manufacturing
[7]EXPANCEL 051 DU expandable microspheres, a product of Casco Nobel AB
[8]KEVLAR fiber, a product of E.I. duPont & Co.
[9]CAB-O-SIL TS720 fumed silica, a product of Cabot
[10]SHIELDEX calcium ion exchanged amorphous silica gel, a product of the Grace Davison division of W.R. Grace.
[11]KEN-REACT KR55 titanate, a product of Kenrich Petrochemicals
[12]KEN-REACT NZ97 zirconate, a product of Kenrich Petrochemicals
[13]KEN-REACT KR238M titanate, a product of Kenrich Petrochemicals
[14]CHARTWELL B 515.4 HR titanate, a product of Chartwell International, Inc.
[15]AKROWAX 5032 wax, a product of Akrochem Corporation

TABLE II-B

| Property | Example 5 | Example 6 | Example 7 | Example 8 | Example 9 | Example 10 | Example 11 | Example 12 | Example 13 | Example 14 |
|---|---|---|---|---|---|---|---|---|---|---|
| 50 g Needle Penetration (uncured. 1/10 mm units | 95 | 66 | 78 | 83 | 77 | 72 | 37 | 41 | 25 | 21 |
| % Expansion | 55.2 | 51.4 | 54.2 | 52.5 | 55.7 | 46.5 | 45.0 | 44.0 | 43.2 | 37.4 |
| Adhesion to Cold Rolled Steel, % Cohesive Failure | | | | | | | | | | |
| Clean | 100[1] | 100[1] | 100[1] | 100[1] | 100[1] | 100[1] | 100[1] | 100[1] | 100[1] | 100[1] |
| Oiled with 61 K2M oil | 100[2] | 100[2] | 100[2] | 100[2] | 100[2] | 100[2] | 100[2] | 100[2] | 100[2] | 100[2] |
| Oiled with Feer oil | 100[2] | 100[2] | 100[2] | 100[2] | 100[2] | 100[2] | 100[2] | 100[2] | 100[2] | 100[2] |
| Compressive Strength | | | | | | | | | | |
| Maximum Load | 4180 | 4030 | 3880 | 4030 | 4210 | 4180 | 4030 | 3880 | 4030 | 4210 |
| Maximum PSI | 2650 | 2560 | 2460 | 2560 | 2670 | 2650 | 2560 | 2460 | 2560 | 2670 |
| Modulus | 139,000 | 136,000 | 130,000 | 139,000 | 141,000 | 139,000 | 136,000 | 130,000 | 139,000 | 141,000 |
| Maximum PSI/Sp. Gravity | 5200 | 5010 | 5120 | 5010 | 5340 | 5200 | 5010 | 5120 | 5010 | 5340 |
| Lap Shear Strength, PSI | 402[1] | 392[1] | 396[1] | 394[1] | 412[1] | 338[1] | 311[1] | 305[1] | 263[1] | 217[1] |
| Lap Shear Strength/Sp. Gravity | 789 | 768 | 825 | 772 | 824 | 662 | 609 | 635 | 516 | 433 |

[1]Cohesive failure
[2]Light cohesive failure (surface of panel appears clean, but a very light coating of the thermoset remains)

TABLE III-A

| Component | Example 15, wt % | Example 16, wt % | Example 17, wt % | Example 18, wt % | Example 19, wt % | Example 20, wt % | Example 21, wt % | Example 22, wt % | Example 23, wt % | Example 24, wt |
|---|---|---|---|---|---|---|---|---|---|---|
| Epoxy Resin A[1] | 40.71 | 41.51 | 39.65 | 42.95 | 44.39 | 42.92 | 42.82 | 42.73 | 42.46 | 42.10 |
| Epoxy Resin B[2] | 12.29 | 12.53 | 11.97 | 12.97 | 13.40 | 12.96 | 12.93 | 12.90 | 12.82 | 12.74 |
| Rubber[3] | 7.68 | 7.83 | 7.48 | 8.10 | 8.38 | 8.10 | 8.08 | 8.06 | 8.01 | 7.96 |
| Curative A[4] | 3.46 | 3.52 | 3.37 | 3.65 | 3.77 | 3.64 | 3.64 | 3.63 | 3.60 | 3.58 |
| Curative B[5] | 0.54 | 0.55 | 0.52 | 0.57 | 0.59 | 0.57 | 0.57 | 0.56 | 0.56 | 0.56 |
| Hollow Glass Microspheres[6] | 18.13 | 18.48 | 17.65 | 19.12 | 19.77 | 22.27 | 22.22 | 22.17 | 22.03 | 21.80 |
| Glass Fiber[7] | 7.68 | 7.83 | 7.48 | 4.05 | — | — | — | — | — | — |
| Calcium Carbonate[8] | 4.61 | 4.70 | 8.98 | 4.86 | 5.03 | 4.86 | 4.85 | 4.84 | 4.81 | 4.78 |
| Acceerator[9] | 0.19 | 0.20 | 0.19 | 0.20 | 0.21 | 0.20 | 0.20 | 0.20 | — | — |
| Blowing AgentA[10] | 0.61 | 0.63 | 0.60 | 0.65 | 0.67 | 0.73 | 0.73 | 0.73 | — | — |
| Blowing Agent B[11] | — | — | — | — | — | — | — | — | 2.00 | 2.39 |
| Thixotropic Agent[12] | 2.15 | — | — | — | — | 1.46 | 1.45 | 1.45 | 1.44 | 1.43 |
| Wax[13] | 0.38 | 0.39 | 0.37 | 0.41 | 0.42 | 0.40 | 0.40 | 0.40 | 0.40 | 0.40 |
| Polyaramid Fiber[14] | — | 0.22 | 0.21 | 0.81 | 1.68 | 0.23 | 0.45 | 0.68 | 0.22 | 0.45 |
| Coupling Agent A[15] | 0.23 | 0.23 | 0.22 | 0.24 | 0.25 | 0.24 | 0.24 | 0.24 | 0.24 | 0.24 |
| Coupling Agent B[16] | 0.58 | 0.59 | 0.56 | 0.61 | 0.63 | 0.61 | 0.61 | 0.60 | 0.60 | 0.60 |
| Coupling Agent C[17] | 0.77 | 0.78 | 0.75 | 0.81 | 0.84 | 0.81 | 0.81 | 0.81 | 0.80 | 0.80 |

[1]PEP 6134 epoxy resin, a product of Peninsula Polymers
[2]DER 732 flexibilizing epoxy resin (diglycidyl ether of polypropylene glycol), a product of Dow Chemical.
[3]NIPCL 1312 nitrile rubber, a product of Zeon.
[4]DYCENEX 200 dicyandiamide, a product of American Cyanamide.
[5]ANJICURE PN-40 amine-epoxy adduct, a product of Ajinomoto
[6]SCOTCHLITE VS 5500 microspheres, a product of Minnesota Mining & Manufacturing.
[7]milled
[8]ULTRAFLEX calcium carbonate, a product of Pfizer
[9]BIK OT urea, a product of Uniroyal.
[10]CELOGEN AZ 120 azodicarbonamide, a prodyct of Uniroyal.
[11]EXPANCEL 051 DU expandable microspheres, a product of Casco Nobel AB
[12]CAB-O-SIL TS720 fumed silica, a product of Cabot.
[13]AKROWAX 5032 wax, a product of Akrochem Corporation.
[14]KEVLAR fiber, a product of E.I. duPont & Co.
[15]CHARTWELL B51 5.4H titanate, a product of Chartwell International, Inc.
[16]KEN-REACT KR 238M titanate, a product of Kenrich Petrochemicals.
[17]KEN-REACT KR55 titanate, a product of Kenrich Petrochemicals.

TABLE III-B

| Component | Example 15 | Example 16 | Example 17 | Example 18 | Example 19 | Example 20 | Example 21 | Example 22 | Example 23 | Example 24 |
|---|---|---|---|---|---|---|---|---|---|---|
| % Expansion | 56.1 | 59.0 | 66.6 | 68.5 | 57.4 | 97.9 | 79.6 | 67.7 | 67.6 | 64.7 |
| Adhesion to Cold Rolled Steel, % Cohesive Failure | | | | | | | | | | |
| Clean | 100 | 100[1] | 100[1] | 100[1] | 100[1] | 100[1] | 100[1] | 100[1] | 100[1] | 100[1] |
| Oiled with 61 K2M oil | 100[1] | 100[1] | 100[1] | 100[1] | 100[1] | 100[1] | 100[1] | 100[1] | 100[1] | 100[1] |
| Oiled with Feercote oil | 100[1] | 100[1] | 100[1] | 100[1] | 100[1] | 100[1] | 100[1] | 100 | 100[1] | 100[1] |
| Compressive Strength | | | | | | | | | | |
| Maximum Load | 3960 | 3810 | 3660 | 4160 | 5460 | 3380 | 3900 | 4410 | 3000 | 2930 |
| Maximum PSI | 2510 | 2420 | 2320 | 2640 | 3460 | 2140 | 2470 | 2790 | 1900 | 1860 |
| Modulus | 146,000 | 142,000 | 139,000 | 160,000 | 190,000 | 124,000 | 138,000 | 156,000 | 109,000 | 105,000 |
| Maximum PSI/Sp. Gravity | 4560 | 5490 | 5160 | 5490 | 6930 | 4550 | 4940 | 5370 | 4140 | 3870 |
| Modulus/Sp. Gravity | 266,000 | 322,000 | 309,000 | 333,000 | 381,000 | 263,000 | 276,000 | 301,000 | 238,000 | 218,000 |
| Lap Shear Strength PSI | 4571 | 4481 | 446 | 4361 | 4891 | 2761 | 426 | 4631 | 3681 | 396 |
| Lap Shear Strength 1/Sp. Gravity | 831 | 1020 | 991 | 908 | 978 | 587 | 851 | 891 | 801 | 824 |

[1]Cohesive failure

Examples 25–29

These examples demonstrate the effect of adding various amounts of wax to an expandable thermosettable composition.

Example 25 is a control example containing no wax. The formulation was applied to metal panels comprised of cold rolled steel, expanded and cured by heating 30 minutes at 275° F. The resulting composites were subjected to 15 scab cycles (GM Test Cycle 1505). The metal surface under the thermoset layer was as corroded as the metal surface not covered by the thermoset layer, with 100% loss of adhesion observed.

Example 26, which contained 0.48 wt % wax, provided a composite on cold rolled steel panels which exhibited about 75% cohesive failure. Around the perimeter of the area initially covered by the thermoset layer, the remaining portion of the panel surface was severely corroded. However, the small isolated areas of the panel where the thermosettable composition had bubbled up away from the panel remained clean (uncorroded). This was quite unexpected, as ordinarily (i.e., in the absence of wax) such is sites exhibit extensive corrosion due to the opportunity for water trapped within such bubbles to contact the metal surface of the panel.

A composite prepared using Example 28, which contained 2 wt % wax, exhibited complete loss of adhesion and severe corrosion of the CRS panel in the area initially covered by the thermosettable composition. It is believed that the loss of adhesion was due to the relatively high amount of wax present.

TABLE IV-A

| Component | Ex. 25[12] wt % | Ex. 26 Wt % | Ex. 27 wt % | Ex. 28 wt % | Ex. 29 wt % |
|---|---|---|---|---|---|
| Epoxy Resin[1] | 46.47 | 46.24 | 45.91 | 45.48 | 45.05 |
| Rubber[2] | 12.06 | 12.00 | 11.92 | 11.81 | 11.70 |
| Curative[3] | 2.41 | 2.40 | 2.38 | 2.36 | 2.34 |
| Wax[4] | — | 0.48 | 1.19 | 2.13 | 3.04 |
| Hollow Glass Microspheres[5] | 20.27 | 20.17 | 20.02 | 19.83 | 19.65 |
| Glass Fiber | 12.06 | 12.00 | 11.92 | 11.81 | 11.70 |
| Blowing Agent[6] | 1.74 | 1.73 | 1.72 | 1.70 | 1.68 |
| Coupling Agent A[7] | 0.41 | 0.41 | 0.41 | 0.40 | 0.40 |
| Coupling Agent B[8] | 0.12 | 0.12 | 0.12 | 0.12 | 0.12 |
| Coupling Agent C[9] | 0.36 | 0.36 | 0.36 | 0.35 | 0.35 |
| Thixotropic Agent[10] | 1.93 | 1.92 | 1.91 | 1.89 | 1.87 |
| Alkaline Earth Metal Modified Silicate[11] | 2.17 | 2.16 | 2.15 | 2.13 | 2.11 |

[1]PEP 61 34 epoxy resin, a product of Peninsula Polymers
[2]NIDOL 1312 nitrile rubber, a product of Zeon
[3]OMICURE BC 120 boron trichloride amine adduct, a product of CVC Specialty Chemicals, Inc.
[4]AKROWAX 5032 wax, a product of Akrochem Corporation
[5]SCOTCHLITE VS-5500 microspheres, a product of Minnesota Mining & Manufacturing
[6]EXPANCEL 051 DU expandable microspheres, a product of Casco Nobel AB
[7]KEN-REACT KR55 titanate, a product of Kenrich Petrochemicals
[8]KEN-REACT NZ97 zirconate, a product of Kenrich Petrochemicals
[9]KEN-REACT KR238M titanate, a product of Kenrich Petrochemicals
[10]CAB-9-SIL TS720 fumed silica, a product of Cabot
[11]SHIELDEX calcium ion exchanged amorphous silica gel, a product of The Grace Davison Division of W. R. Grace
[12]comparative example

TABLE IV-B

| Property | Ex. 25 | Ex. 26 | Ex. 27 | Ex. 28 | Ex. 29 |
|---|---|---|---|---|---|
| 50 g Needle Penetration (uncured), 1/10 mm units | 78.3 | 71.0 | 80.3 | 63.7 | 72.7 |
| % Expansion | 59.9 | 52.4 | 47.9 | 49.5 | 38.2 |
| Adhesion to Cold Rolled Steel, % Cohesive Failure | | | | | |
| Clean | 100 | 100 | 100 | 100 | 100 |
| Oiled | 100 | 100 | 100 | 100 | 100 |

TABLE IV-B-continued

| Property | Ex. 25 | Ex. 26 | Ex. 27 | Ex. 28 | Ex. 29 |
|---|---|---|---|---|---|
| Compressive Strength | | | | | |
| Max. Load | 7,130 | 7,660 | 6,690 | 8,360 | 8,080 |
| Max. PSI | 2,270 | 2,440 | 2,130 | 2,660 | 2,570 |
| Modulus | 140,000 | 151,000 | 135,000 | 153,000 | 162,000 |
| Lap Shear Strength, PSI | 357 | 290 | 314 | 298 | 215 |

TABLE V-A

| Component | Ex. 30 wt % | Ex. 31 wt % | Ex. 32 wt % | Ex. 33 wt % | Ex. 34 wt % | Ex. 35 wt % | Ex. 36 wt % | Ex. 37 wt % | Ex. 38 wt % | Ex. 39 Wt % | Ex. 40 wt % | Ex. 41 wt % | Ex. 42 wt % | Ex. 43 wt % |
|---|---|---|---|---|---|---|---|---|---|---|---|---|---|---|
| Epoxy Resin[1] | 46.13 | 46.02 | 45.91 | 46.02 | 45.91 | 46.02 | 45.91 | 46.02 | 45.91 | 45.91 | 45.91 | 45.86 | 45.91 | 45.86 |
| Rubber[2] | 11.98 | 11.95 | 11.92 | 11.95 | 11.92 | 11.95 | 11.92 | 11.95 | 11.92 | 11.92 | 11.92 | 11.90 | 11.92 | 11.90 |
| Curative A[3] | 2.40 | 2.39 | 2.38 | 2.39 | 2.38 | 2.39 | 2.38 | 2.39 | 2.38 | 2.38 | 2.38 | 2.38 | 2.38 | 2.38 |
| Curative B[4] | 0.72 | 0.72 | 0.72 | 0.72 | 0.72 | 0.72 | 0.72 | 0.72 | 0.72 | 0.72 | 0.72 | 0.71 | 0.72 | 0.71 |
| Wax A[5] | — | 0.24 | 0.48 | — | — | — | — | — | — | — | 0.48 | 0.48 | 0.48 | 0.48 |
| Wax B[6] | — | — | — | 0.24 | 0.48 | — | — | — | — | — | — | — | — | — |
| Wax C[7] | — | — | — | — | — | 0.24 | 0.48 | — | — | — | — | — | — | — |
| Wax D[8] | — | — | — | — | — | — | — | 0.24 | 0.48 | — | — | — | — | — |
| Hollow Glass Microsphere[9] | 20.12 | 20.07 | 20.02 | 20.07 | 20.02 | 20.07 | 20.02 | 20.07 | 20.02 | 20.02 | 20.02 | 20.00 | 20.02 | 20.00 |
| Blowing Agent[10] | 1.72 | 1.72 | 1.72 | 1.72 | 1.72 | 1.72 | 1.72 | 1.72 | 1.72 | 1.72 | 1.72 | 1.71 | 1.72 | 1.71 |
| Glass Fiber | 11.98 | 11.95 | 11.92 | 11.95 | 11.92 | 11.95 | 11.92 | 11.95 | 11.92 | 11.92 | 11.92 | 11.90 | 11.92 | 11.90 |
| Thixotropic Agent[11] | 1.92 | 1.91 | 1.91 | 1.91 | 1.91 | 1.91 | 1.91 | 1.91 | 1.91 | 1.91 | 1.91 | 1.90 | 1.91 | 1.90 |
| Alkaline Earth Metal Modified Silicate[12] | 2.16 | 2.15 | 2.15 | 2.15 | 2.15 | 2.15 | 2.15 | 2.15 | 2.15 | 2.15 | 2.15 | 2.14 | 2.15 | 2.14 |
| Coupling Agent A[13] | 0.41 | 0.41 | 0.41 | 0.41 | 0.41 | 0.41 | 0.41 | 0.41 | 0.41 | 0.41 | 0.41 | 0.40 | 0.41 | 0.40 |
| Coupling Agent B[14] | 0.12 | 0.12 | 0.12 | 0.12 | 0.12 | 0.12 | 0.12 | 0.12 | 0.12 | 0.12 | — | — | — | — |
| Coupling Agent C[15] | 0.36 | 0.36 | 0.36 | 0.36 | 0.36 | 0.36 | 0.36 | 0.36 | 0.36 | 0.36 | 0.36 | 0.36 | 0.36 | 0.36 |
| Coupling Agent D[16] | — | — | — | — | — | — | — | — | — | — | 0.12 | 0.24 | — | — |
| Coupling Agent E[17] | — | — | — | — | — | — | — | — | — | — | — | — | 0.12 | 0.24 |

[1]PEP 6134 epoxy resin, a product of Peninsuia Polymers
[2]NIPOL 1312 nitrile rubber, a product of Zeon
[3]OMICURE BC 120 boron trichloride amine adduct, a product of CVC Specialty Chemicals, Inc.
[4]AMICURE CG-140 dicyandiamide, a product of Air Products
[5]AKROWAX 5030 wax, a product of Akochem Corporation
[6]AKROWAX 5031 wax, a product of Akrochem Corporation
[7]AKROWAX 5032 wax, a product of Akrochem Corporation
[8]AKROWAX PE-LM low molecular weight polyethylene wax, a product of Akrochem Corporation
[9]SCOTCHLITE VS-5500 microspheres, a product of Minnesota Mining & Manufacturing
[10]EXPANCEL 051 DU expandable microspheres, a product of Casco Nobel AB
[11]CAB-O-SIL TS720 fumed silica, a product of Cabot
[12]SHIELDEX calcium ion exchanged amorphous silica, a product of the Grace Davison Division of W. R. Grace
[13]KEN-REACT KR55 titanate, a product of Kenrich Petrochemicals
[14]KEN-REACT NZ97 zirconate, a product of Kenrich Petrochemicals
[15]KEN-REACT KR238M titanate, a product of Kenrich Petrochemicals
[16]CHARTWELL BS1S.1H titanate, a product of Chartwell International, Inc.
[17]CHARTWELL B515.4H titanate, a product of Chartwelf International, lnc.
[18]comparative example

TABLE V-B

| Property | Ex. 30 | Ex. 31 | Ex. 32 | Ex. 33 | Ex. 34 | Ex. 35 | Ex. 36 | Ex. 37 | Ex. 38 | Ex. 39 | Ex. 40 | Ex. 41 | Ex. 42 | Ex. 43 |
|---|---|---|---|---|---|---|---|---|---|---|---|---|---|---|
| 50 g Needle Penetration (uncured)1/ 10 mm units | 96.7 | 116 | 75.6 | 103.8 | 114.7 | 95.3 | 106.3 | 96.7 | 93 | 87 | 82 | 81 | 87 | 83 |

TABLE V-B-continued

| Property | Ex. 30 | Ex. 31 | Ex. 32 | Ex. 33 | Ex. 34 | Ex. 35 | Ex. 36 | Ex. 37 | Ex. 38 | Ex. 39 | Ex. 40 | Ex. 41 | Ex. 42 | Ex. 43 |
|---|---|---|---|---|---|---|---|---|---|---|---|---|---|---|
| % Expansion | 42.7 | 49.8 | 50.6 | 47.6 | 53.3 | 60.3 | 49.1 | 55.6 | 53.3 | 49.7 | 62.6 | 55.7 | 54.1 | 60.0 |
| Adhesion to Cold Rolled Steel, % Cohesive Failure | | | | | | | | | | | | | | |
| Clean | 100[1] | 100[1] | 100[1] | 100[1] | 100[1] | 100[1] | 100[1] | 100[1] | 100[1] | | | | | |
| Oiled W/ MALCH N1 Oil | 100[1] | 100[1] | 100[1] | 100[1] | 100[1] | 100[1] | 100[1] | 100[1] | 100[1] | | | | | |
| Oiled w/261 K2M Oil | 100[1] | 100[1] | 100[1] | 100[1] | 100[1] | 100[1] | 100[1] | 100[1] | | | | | | |
| Compressive Strength | | | | | | | | | | | | | | |
| Max. Load | 8,300 | 6,650 | 7,000 | 7,590 | 7,160 | 7,400 | 6,880 | 7,620 | 7,570 | 5,710 | 5,780 | 5,390 | 7,430 | 6,150 |
| Max. PSI | 2,780 | 2,230 | 2,330 | 2,600 | 2,400 | 2,480 | 2,310 | 2,560 | 2,540 | 1,920 | 1,940 | 1,810 | 2,490 | 2,060 |
| Modulus | 168,000 | 149,000 | 124,000 | 155,000 | 126,000 | 151,000 | 144,000 | 153,000 | 149,000 | 145,000 | 145,000 | 143,000 | 153,000 | 133,000 |
| Lap Shear Strength, PSI (clean) | 397 | 415 | 381 | 407 | 380 | 369 | 318 | 281 | 335 | 341 | 337 | 313 | 363 | 361 |
| Lap Shear Strength, PSI (oiled) | 289 | 263 | 183 | 280 | i89 | 263 | 243 | 283 | 242 | 242 | — | — | 212 | 282 |

[1]cohesive failure

What is claimed is:

1. A thermosettable composition comprising:
   (a) one or more thermosettable resins;
   (b) one or more curatives;
   (c) one or more waxes; and
   (d) at least one member selected from the group consisting of hollow glass microspheres and alkaline earth metal-modified silicates.

2. The thermosettable composition of claim 1 wherein at least one of the waxes is selected from the group consisting of paraffin waxes and microcrystalline waxes.

3. The thermosettable composition of claim 1 wherein said waxes comprise from about 0.1 to about 1% by weight of the thermosettable composition.

4. The thermosettable composition of claim 1 additionally comprising one or more coupling agents.

5. The thermosettable composition of claim 4 wherein at least one of the coupling agents is selected from the group consisting of organic titanates and organic zirconates.

6. The thermosettable composition of claim 1 wherein at least one of the thermosettable resins is an epoxy resin.

7. The thermosettable composition of claim 1 wherein at least one of the thermosettable resins is a glycidyl ether of a polyhydric phenol.

8. The thermosettable composition of claim 1 additionally comprising one or more blowing agents.

9. The thermosettable composition of claim 8 wherein at least one of the blowing agents is selected from the group consisting of expandable microspheres, azo compounds and sulfonyl hydrazides.

10. The thermosettable composition of claim 1 wherein at least one of the curatives is selected from the group consisting of guanidines, amine-epoxy adducts, and boron trichloride amine adducts.

11. The thermosettable composition of claim 1 comprising from about 10 to about 30 weight percent hollow glass microspheres.

12. The thermosettable composition of claim 1 additionally comprising one or more fillers.

13. The thermosettable composition of claim 12 wherein at least one of the fillers is selected from the group consisting of glass fibers, polymeric fibers, mica, wollastonite, and calcium carbonate.

14. The thermosettable composition of claim 1 additionally comprising one or more thixotropic agents.

15. The thermosettable composition of claim 14 wherein at least one of the thixotropic agents is fumed silica.

16. The thermosettable composition claim 1 comprising one or more alkaline earth metal-modified silicates selected from calcium ion exchanged amorphous silica gels.

17. A thermoset obtained by curing the thermosettable composition of claim 1.

18. A composite comprised of a solid article having a metal surface and the thermoset of claim 17, said thermoset being adhered to at least a portion of said metal surface.

19. A composite comprised of a solid article having a metal surface and the thermosettable composition of claim 1, said thermosettable composition being adhered to at least a portion of said metal surface.

20. A foamable thermosettable composition comprising:

| | % by weight |
|---|---|
| wax(es) | about 0.1 to about 1 |
| epoxy resin(s) | about 40 to about 60 |
| rubber(s) | about 5 to about 15 |
| curative(s) | about 1 to about 6 |
| hollow glass microsphere(s) | about 10 to about 30 |
| filler(s) | about 10 to about 15 |
| blowing agent(s) | about 0.2 to about 4 |
| thixotropic agent(s) | about 1 to about 3 |
| coupling agent(s) | about 0.5 to about 1.5 |
| alkaline earth metal modified silicate(s) | about 1 to about 3. |

21. A foam obtained by heating and curing the foamable thermosettable composition of claim 20.

22. A composite comprised of a solid article having a metal surface and the foam of claim 21, said foam being adhered to at least a portion of said metal surface.

23. A composite comprised of a solid article having a metal surface and the foamable thermosettable composition of claim 20, said foamable thermosettable composition being adhered to at least a portion of said metal surface.

24. A composite comprised of a solid article having a metal surface and a foam obtained by heating and curing a foamable thermosettable composition comprising:
 (a) from about 30 to about 70% by weight of one or more epoxy resins, at least one of said epoxy resins being a glycidyl ether of a polyhydric phenol;
 (b) from about 0.05 to about 10% by weight of one or more curatives, at least one of said curatives being selected from the group consisting of guanidines, amine-epoxy adducts, and boron trichloride amine adducts;
 (c) from about 0.1 to about 5% by weight of one or more blowing agents, at least one of said blowing agents being selected from the group consisting of expandable microspheres, azo compounds, and sulfonyl hydrazides; and
 (d) from about 0.1 to about 1% by weight of one or more waxes, at least one of said waxes being selected from the group consisting of paraffin waxes and microcrystalline waxes.

25. A composite comprised of a solid article having a metal surface and a foamable thermosettable composition comprised of:
 (a) from about 30 to about 70% by weight of one or more epoxy resins, at least one of said epoxy resins being a glycidyl ether of a polyhydric phenol;
 (b) from about 0.05 to about 10% by weight of one or more curatives, at least one of said curatives being selected from the group consisting of guanidines, amine epoxy adducts, and boron trichloride amine adducts;
 (c) from about 0 1 to about 5% by weight of one or more blowing agents, at least one of said blowing agents being selected from the group consisting of expandable microspheres, azo compounds, and sulfonyl hydrazides, and
 (d) from about 0.1 to about 1% by weight of one or more waxes, at least one of said waxes being selected from the group consisting of paraffin waxes and microcrystalline waxes; said foamable thermosettable composition being adhered to at least a portion of said metal surface.

26. A method of inhibiting corrosion of a metal surface in a conposite in contact with a foam obtained by heating and curing a foamable thermosettable composition comprising one or more epoxy resins, one or more curatives and one or more blowing agents, said method comprising incorporating into the foamable thermosettable composition an amount of one or more waxes effective to reduce corrosion of said metal surface upon exposure of the composite to moisture.

* * * * *

UNITED STATES PATENT AND TRADEMARK OFFICE
CERTIFICATE OF CORRECTION

PATENT NO. : 6,403,222 B1
DATED : June 11, 2002
INVENTOR(S) : Bruce L. Harrison

It is certified that error appears in the above-identified patent and that said Letters Patent is hereby corrected as shown below:

Column 20,
Line 7, between "amine" and "epoxy", insert therefor -- - --.
Line 9, delete "0 1", and insert therefor -- 0.1 --.
Line 13, delete ",", and insert therefor -- ; --.
Line 20, delete "conposite", and insert therefor -- composite --.

Signed and Sealed this

Eighth Day of April, 2003

JAMES E. ROGAN
*Director of the United States Patent and Trademark Office*